D. H. Chamberlain.
Making Axles.
No. 309. Reissued May 15, 1855.
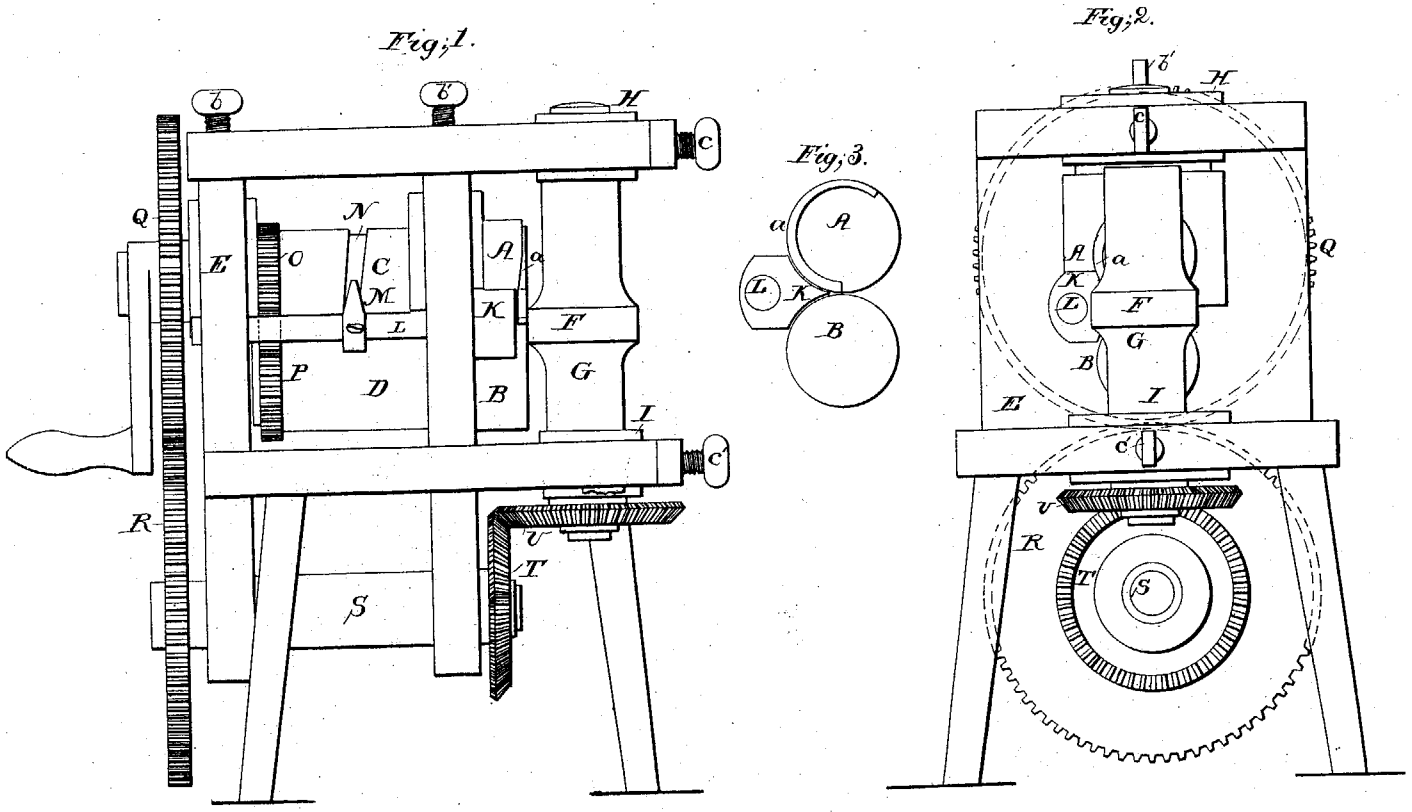
N. PETERS, PHOTO-LITHOGRAPHER, WASHINGTON, D. C.

UNITED STATES PATENT OFFICE.

DEXTER H. CHAMBERLAIN, OF BOSTON, MASSACHUSETTS, ASSIGNEE, BY MESNE ASSIGNMENTS, OF PETER COOPER, OF NEW YORK, N. Y.

IMPROVEMENT IN MACHINERY FOR REDUCING METAL BARS.

Specification forming part of Letters Patent No. 9,542, dated January 18, 1853; Reissue No. 309, dated May 15, 1855.

*To all whom it may concern:*

Be it known that I, DEXTER H. CHAMBERLAIN, of Boston, in the State of Massachusetts, have invented certain new and useful Improvements in Machinery for Reducing Metal Bars, of which the following is a full, clear, and exact description thereof, reference being had to the accompanying drawings, making part of this specification, in which—

Figure 1 is a side elevation of my improvement as applied to reducing iron rods to a shape suitable for nails or other articles of like character; Fig. 2, an end elevation of the same, and Fig. 3 an end view of the rollers and bolster.

In the said drawings A and B represent two horizontal rollers applied, respectively, upon the adjacent ends of two parallel shafts, C D, that are supported in suitable bearings in a frame, E, of suitable construction. The end of one of those rollers has a cavity, *a*, formed in it to the required depth from the periphery and end. At the end of these two rollers, and at right angles to their axes, there is a third roller, F, the periphery of which rolls against the ends of the two rollers A B. The said third roller, F, is fixed on a shaft, G, mounted in suitable bearings, H I, in the frame. A block of metal, K, called a "bolster," with its inner face curved to fit into the space in front of the bite of the two rollers A B, is attached to or made a part of a slide, L, supported by the frame, as represented, so as to receive a free endwise motion by means of an arm or stem, M, projecting from it, and fitted to a cam-groove, N, formed in the periphery of the shaft C of the roller A; and the form of this cam-groove should be such as to keep the front face of the bolster K in line with the face of the cavity *a* of the roller as the several rollers rotate, and, therefore, the inclination of the cam-groove should have the same pitch as the face of the cavity. The object of this bolster is to prevent the metal, while being drawn in a wedge form between the roller F and the face of the cavity in the roller A from spreading out and being drawn in between the cylindrical parts of the rollers A and B and forming a fin on the rod, which would be likely to occur in drawing wedge-formed rods. The two shafts C D are geared together by spur-wheels O P, and on the outer end of the shaft C there is a spur-wheel, Q, that engages another spur-wheel, R, of equal diameter on a horizontal shaft, S, which communicates motion by two bevel-wheels, T U, to the shaft G of the third roller, F. The proper distance of the rollers can be adjusted by the application of screws *b b'* and *c c'* acting on the boxes in manner well known. The reduction of a bar or rod on its four sides is effected by introducing it in the cavity between the rollers A B and the roller F and the opposite face of the cavity *a*. It will be obvious that the form of the cavity *a* will depend upon the form desired to be given to a bar or rod, and, therefore, if it be desired to produce a bar or rod with parallel faces in the direction of the length, the cavity must be made parallel with the periphery and end face of the roller A, in which case the bolster, if employed, can be stationary. If the bar or rod is to be reduced to a form with two faces parallel, and the others inclined or wedge-form, the periphery of the cavity may be eccentric, so as to roll the wedge between the rollers A and B, while the parallel faces will be reduced or produced between the roller F and the face of the cavity, or vice versa. And it will also be obvious that the cavity may be made in either of the rollers A B, or partly in one and partly in the other, and occupy a portion of or the entire circumference of the roller or rollers.

What I claim as my invention, and desire to secure by Letters Patent, is—

1. The method of rolling bars or rods on four sides by the combination of three rollers arranged with the axes of two of them parallel and the third at right angles thereto, substantially as specified, whereby two opposite faces of the bar or rod are drawn between the two rollers on parallel axes, and the other two faces between the periphery of the third roller and the face of a cavity formed in one or both of the other rollers, as specified.

2. In combination with the three rollers, combined and arranged substantially as specified, the employment of the bolster, substantially as specified, to prevent the forming of a fin on the bar at the junction of the two parallel rollers, as set forth.

DEXTER H. CHAMBERLAIN.

Witnesses:

J. FRANCIS HOWE,

CHAS. C. DARLING.